United States Patent [19]
McGinnis

[11] Patent Number: 5,511,652
[45] Date of Patent: Apr. 30, 1996

[54] CONSTRUCTION CONVEYOR BELT

[76] Inventor: Terry W. McGinnis, 1638 S. Cleveland-Massillon Rd., Akron, Ohio 44321

[21] Appl. No.: 274,202

[22] Filed: Jul. 12, 1994

[51] Int. Cl.⁶ .................................................. B65G 15/08
[52] U.S. Cl. .................... 198/819; 198/690.2; 198/699
[58] Field of Search ................................ 198/819, 821, 198/690.2, 699, 847

[56] References Cited

U.S. PATENT DOCUMENTS

| | | | |
|---|---|---|---|
| 499,472 | 6/1893 | Robins | 198/847 |
| 981,312 | 1/1911 | Robins | 198/847 |
| 3,013,499 | 12/1961 | Hubert | 198/819 |
| 3,144,930 | 8/1964 | Michels | 198/847 |
| 3,179,238 | 4/1965 | Patin | 198/847 |
| 3,595,378 | 7/1971 | Kamisaka | 198/819 |
| 3,900,627 | 8/1975 | Angioletti et al. | 428/114 |
| 4,004,467 | 1/1977 | Kenney | 74/233 |
| 4,061,223 | 12/1977 | McGinnis | 198/821 |
| 4,410,082 | 10/1983 | McGinnis | 198/818 |
| 4,411,947 | 10/1983 | Heynhold | 428/250 |
| 4,572,359 | 2/1986 | Fujita et al. | 198/819 |
| 4,747,747 | 5/1988 | Fusco et al. | 414/528 |
| 5,004,098 | 4/1991 | Marshall | 198/847 |
| 5,351,810 | 10/1994 | Tingskog | 198/819 |

FOREIGN PATENT DOCUMENTS 218412   9/1988   Japan .................................... 198/819

Primary Examiner—Joseph E. Valenza
Attorney, Agent, or Firm—Roger D. Emerson

[57] ABSTRACT

An improved conveyor belt construction includes lateral edges which fold upwardly and inwardly upon the application of longitudinal directed tension. The tendency of the lateral edges of the belt to curve upwardly and inwardly, coupled with the presence of locked plates, enable the belt to form a series of completely enclosed box-like structures which can move powdery ash-like materials with ease. The construction includes five layers, two of which are reinforced with reinforcing cords laid at differing angles.

3 Claims, 6 Drawing Sheets

CONSTRUCTION CONVEYOR BELT

BACKGROUND OF THE INVENTION

1. Field of Invention

This invention pertains generally to the art of conveyor belts, and more specifically to conveyor belts having a construction so that lateral edges of the conveyor belts fold inwardly upon the application of longitudinally-directed tension.

2. Description of Related Art

In the past, stretchable conveyor belts have been constructed of elastomeric material reinforced with fabric or metallic cords to provide transverse rigidity and maintain tension in the belt. In U.S. Pat. No. 4,061,223 to McGinnis a conveyor belt construction was disclosed which incorporates U-shaped transverse supports and pre-stretching of the belt to maintain a trough effect to aid conveyance of material along horizontal and vertical curves. In U.S. Pat. No. 4,410,082, also to McGinnis, another belt is disclosed which is constructed so that the sides of the belt curl upward and inward upon application of longitudinal tension, thereby cradling the load through horizontal and vertical curves. In U.S. Pat. No. 5,004,098 to Marshall, a means of limiting the stretch of the central portion of he conveyor belt while allowing the outside edge of the belt to elongate to negotiate a horizontal curve is disclosed.

While conveyor belts are used advantageously in a variety of environments and applications, the conveyance of wet, free-flowing, or powder-like materials still poses a challenge, especially around horizontal and vertical curves.

The present invention contemplates a new and improved conveyor belt which incorporates the strengths of the aforementioned belts with unique features allowing for better and more advantageous results.

SUMMARY OF THE INVENTION

In accordance with the present invention, a new and improved conveyor belt construction is provided which can be used for conveying of materials through horizontal and vertical curves, especially materials which are powder-like, wet, or free-flowing. The inventive belt features a innovative construction which provides performance and cost advantages over the prior art.

More particularly, in accordance with the invention, the conveyor belt comprises at least four layers, two of which consist of reinforcing cords placed in a crisscross pattern.

According to another aspect of the invention, the reinforcing cords within the respective layers are woven, having one set of mutually parallel cords first above, then below successive cords in a second set of mutually parallel cords.

According to another aspect of the invention, the two layers of reinforcing cords differ in respect to the angle the cords therein make with the centerline of the belt.

According to another aspect of the invention, the conveyor belt is equipped with locking plates to aid in the conveyance of materials through vertical curves.

According to another aspect of the invention, when tension is applied in the longitudinal direction, the lateral edges of the belt fold inwardly and upwardly to overlap each other.

According to another aspect of the invention, the overlapping lateral edges are supported by the vertical locking plates, creating box-like structures to completely enclose the load.

According to another aspect of the invention, a first layer of reinforcing cords form a crisscross pattern extending the entire width of the first layer and a second layer of reinforcing cords form a crisscross pattern extending the width of a central portion only of the second layer.

One advantage of the present invention is the complete enclosure of the load without the use of cover belts. The conveyor belt utilizes the locking plates and the overlapping lateral edges to form box-like enclosures providing a self-covering system especially helpful in the conveyance of wet, free-flowing or powder-like materials.

Another advantage of the present invention is the even distribution of the load, particularly through vertical curves, by use of the aforementioned locking plates and overlapping lateral edges.

Another advantage of the present invention is the ability to provide longer-distance conveying due to the reinforced structure.

Yet another advantage of the present invention is that it comprises fewer layers than other stretchable, selftroughing conveyor belts. The fewer layers leads to cost and performance advantages.

Yet another advantage of the present invention is that it can go around corners. In a conventional belt, the inside wall or edge of the belt would crumple or fold at the inside corner of a turn. Because the inventive belt is pre-stressed, being pre-loaded with a tensile load, the edge of the belt which is at the inside corner of a turn simply sees less tension than the other edge of the belt; it doesn't crumple or fold.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
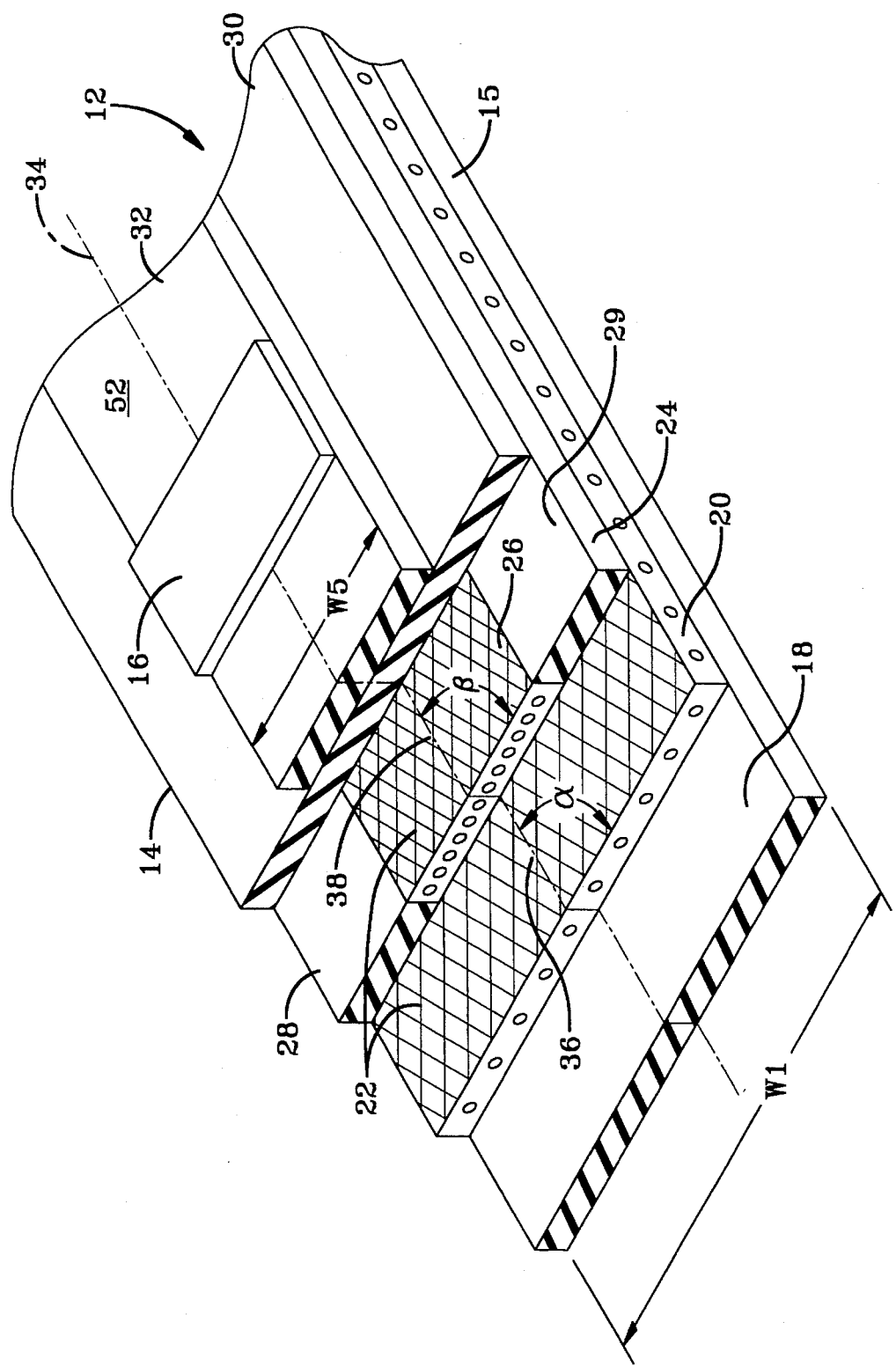
FIG. 1 is a perspective view, partially broken away, of a conveyor belt according to one embodiment of the invention.

Referring now to the drawings, which are for the purposes of illustrating a preferred embodiment of the invention only, and not for purposes of limiting the invention, FIG. 1 shows a conveyor belt 12 comprising elastomeric layers, with a common centerline 34 and lateral edges 14,15. The conveyor belt 12 comprises a first or bottom layer 18, a second or reinforced layer 20, a third or split layer 24, a fourth or top layer 30, a fifth or strip layer 32. In one embodiment, the belt further comprises lock plates 16.

The first layer 18 is typically the bottom layer of the belt 12. In the preferred embodiment, it is not reinforced with reinforcing fibers although it may be reinforced with a flocked reinforcement such as Kevlar® (Kevlar is a registered trademark of DuPont.). The first layer 18 is preferably stiffer than the top or fourth layer 30. In the preferred embodiment, the first layer 18 is about 0.25 inches thick.

Figure 2:
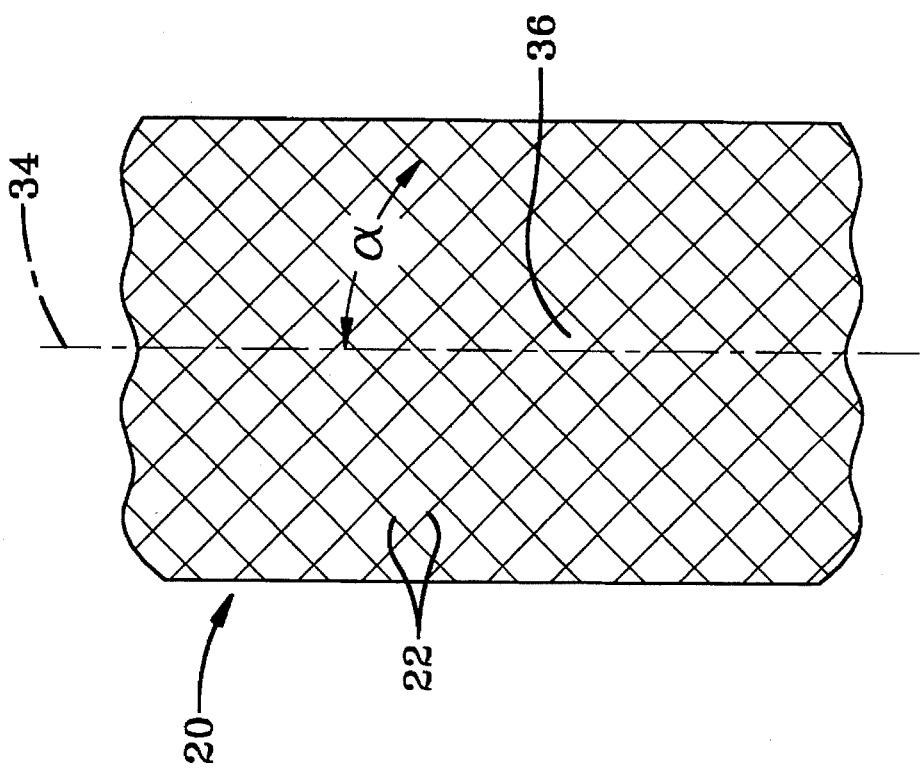
FIG. 2 is a top view of a first reinforced layer of a conveyor belt according to the invention.

With reference to FIGS. 1 and 2, the second layer 20 is located on top of the first layer 18. The second layer 20 is preferably reinforced with reinforcing cords 22. The reinforcing cords are preferably made of Kevlar®. In the preferred embodiment, the reinforcing cords 22 in the second layer 20 make an angle α between 30° and 60° with the centerline CL. In the preferred embodiment, α is equal to 45°. In one embodiment, the cords 22 are woven, having one set of mutually parallel cords 22 first above, then below successive cords 22 in a second set of mutually parallel cords 22. In another embodiment, the cords 22 aren't woven but are merely crossed.

Figure 3:
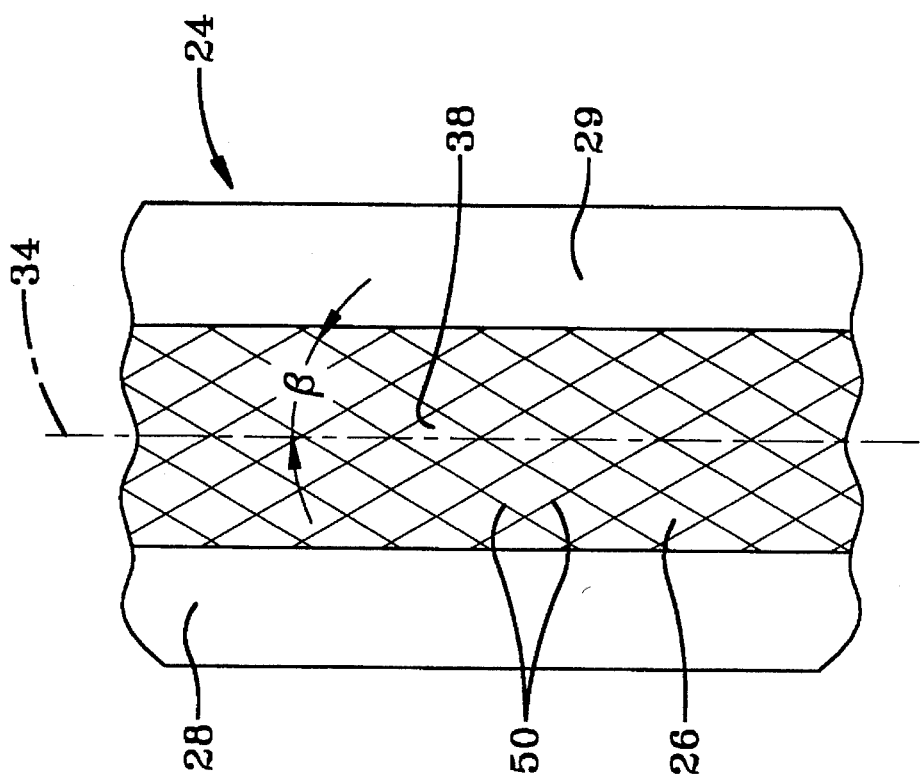
FIG. 3 is a top view of a second reinforced layer of a conveyor belt according to the invention.

With reference to FIGS. 1 and 3, the third layer is located on top of the second layer 20. The third layer 24 comprises a central section 26 and first and second outer sections 28,29. The central section 26 includes reinforcing cords 50. These cords 50 are also made of Kevlar® similarly to reinforcing cords 22. However, reinforcing cords 50 in the central section 26 of the third layer make an angle B with the centerline 34. Angle B can range between 15° and 45° and in the preferred embodiment is equal to 30°.

The top or fourth layer 30 is located on top of the third layer 24. The third layer is similar to the first layer 18 in that it is not reinforced with fibers although it can be reinforced with flocked reinforcements such as chopped Kevlar®. In the preferred embodiment, the thickness of the top layer 30 is generally about one-half of the thickness of the first layer 18 and is therefore less stiff.

The fifth layer 32 is located on top of the fourth layer 30 and has a width W5 which is between 30% and 60% the width W1 of the belt 12. The fifth layer 32 does not have reinforcing cords but may be reinforced with flocked materials, such as flocked Kevlar®.

In one embodiment, locking plates 16 are attached to a top surface 52 of the fifth layer 32. Locking plates 16 are useful in conveying certain types of loads up inclines. For example, with reference to FIG. 7, a cross-sectional schematic view of a conveyor belt utilizing locking plates 16 is illustrated. However, in the present invention, the innovative construction of the belt 12, along with the ability of the lateral edges 14,15 of the belt 12 to curl upon application of longitudinal tension, is coupled advantageously with the lock plates 16 to create an innovative new belt 12.

Figure 4:
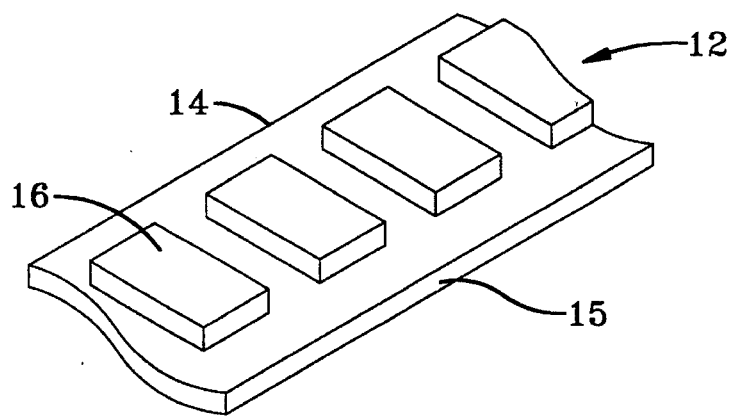
FIG. 4 is a perspective view of an unstretched belt with lock plates.
Figure 5:
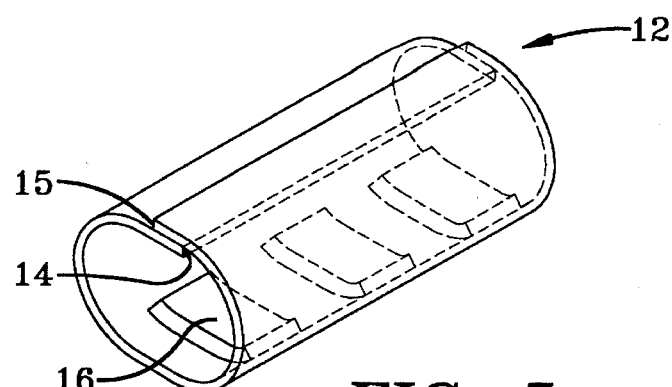
FIG. 5 is a perspective view of a fully stretched belt, shown with the lateral edges of the belt folded over the lock plates.
Figure 6:
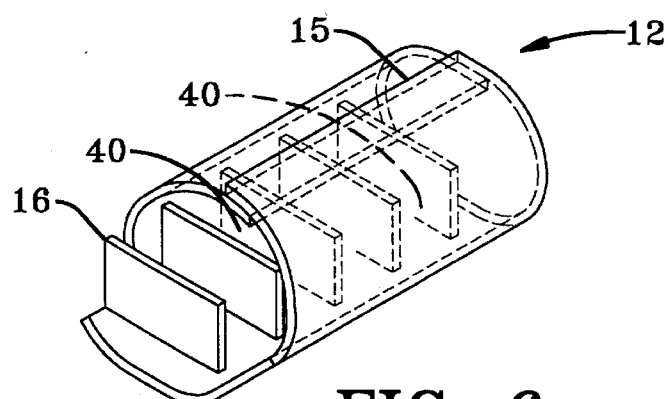
FIG. 6 is a perspective view of a fully stretched belt, partially broken away, showing the box-like enclosures created by the vertical lock plates.

With reference to FIGS. 4–6, the inventive belt construction will be further illustrated. With reference to FIG. 4, a perspective view of the unstretched conveyor belt 12 comprising lock plates 16 is shown. In the preferred embodiment, the width of the lock plates 16 is less than the width W1 between the lateral edges 14,15 of the conveyor belt 12 and is essentially equal to the width W5 of the fifth layer 32.

As described more fully in U.S. Pat. Nos. 4,061,223 and 4,410,082 to McGinnis, which are incorporated by reference herein in their entireties, the belt 12 will form a trough upon application of tension directed in the longitudinal direction, essentially along centerline 34. The application of such tension causes lateral edges 14,15 to curl upwardly and toward each other. This tendency, coupled with the presence of lock plates 16, enable the present invention to create an enclosed box-like structure as shown in FIG. 6. The lock plates 16 support the folded over and overlapping lateral edges 14,15. The lock plates 16 lie flat against the belt 12 when it is in an unstretched position. As shown in FIG. 5, application of longitudinal tension will cause the lock plates 16 to move into a vertical position while the lateral edges 14,15 are curling upwardly and inwardly.

FIG. 5 shows the conveyor belt 12 in a fully stretched position. The location of the lock plates and one lateral edge 14 are represented by hidden lines. FIG. 5 illustrates how one lateral edge 14 overlaps the other when the conveyor belt 12 is stretched.

Figure 7:
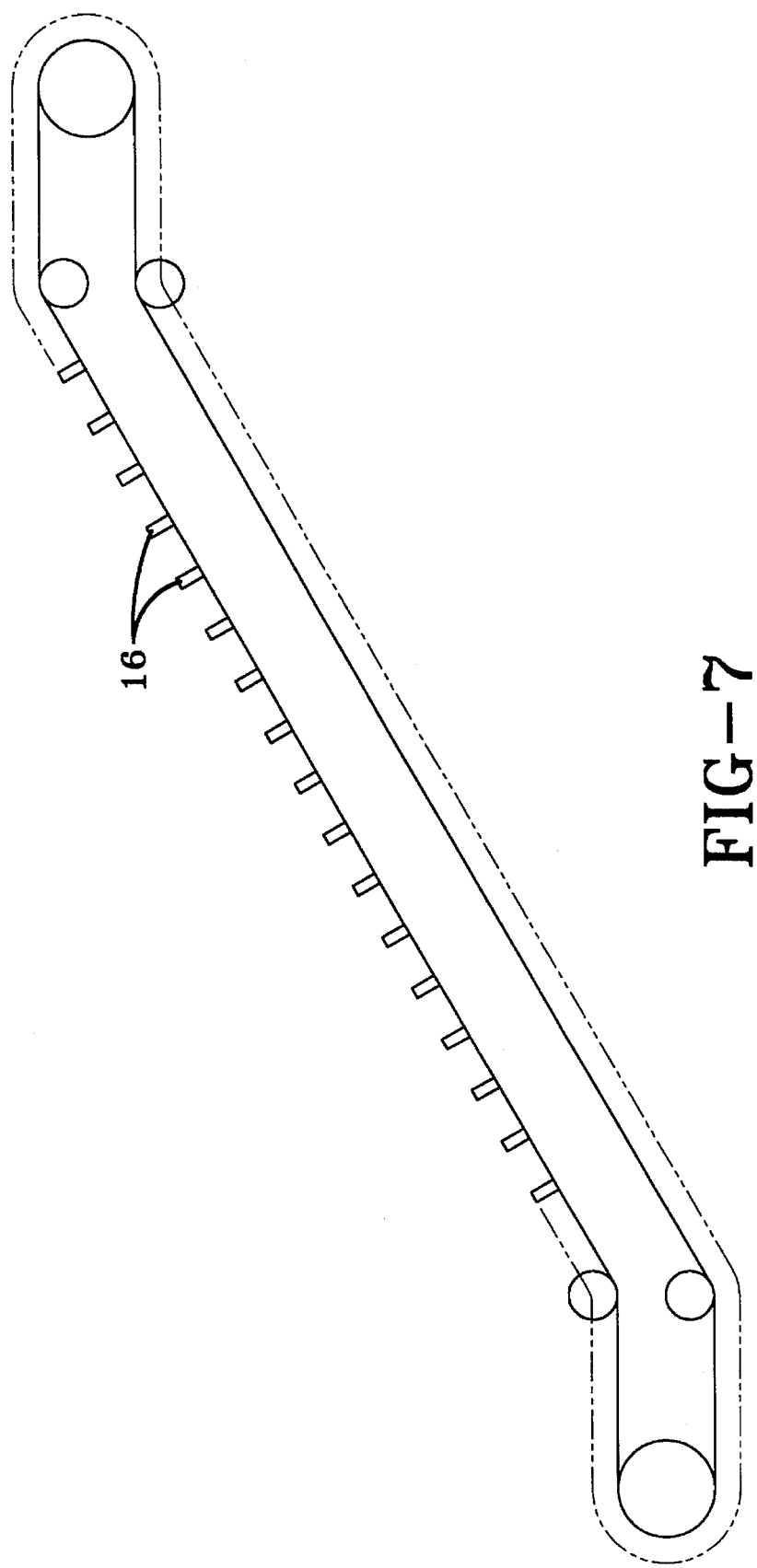
FIG. 7 is a side view of one embodiment of the invention showing a vertical incline.

When conveyor belt 12 is fully stretched the lock plates 16 move into a vertical position as illustrated in FIG. 6, one lateral edge 14 overlaps the other and box-like enclosures 40 are formed. In the preferred embodiment, lock plates 16 and the lateral edges 14,15 combine to form a self-enclosing system. FIG. 7 illustrates the action of the lock plates 16 in moving a load through a vertical incline.

Figure 8:
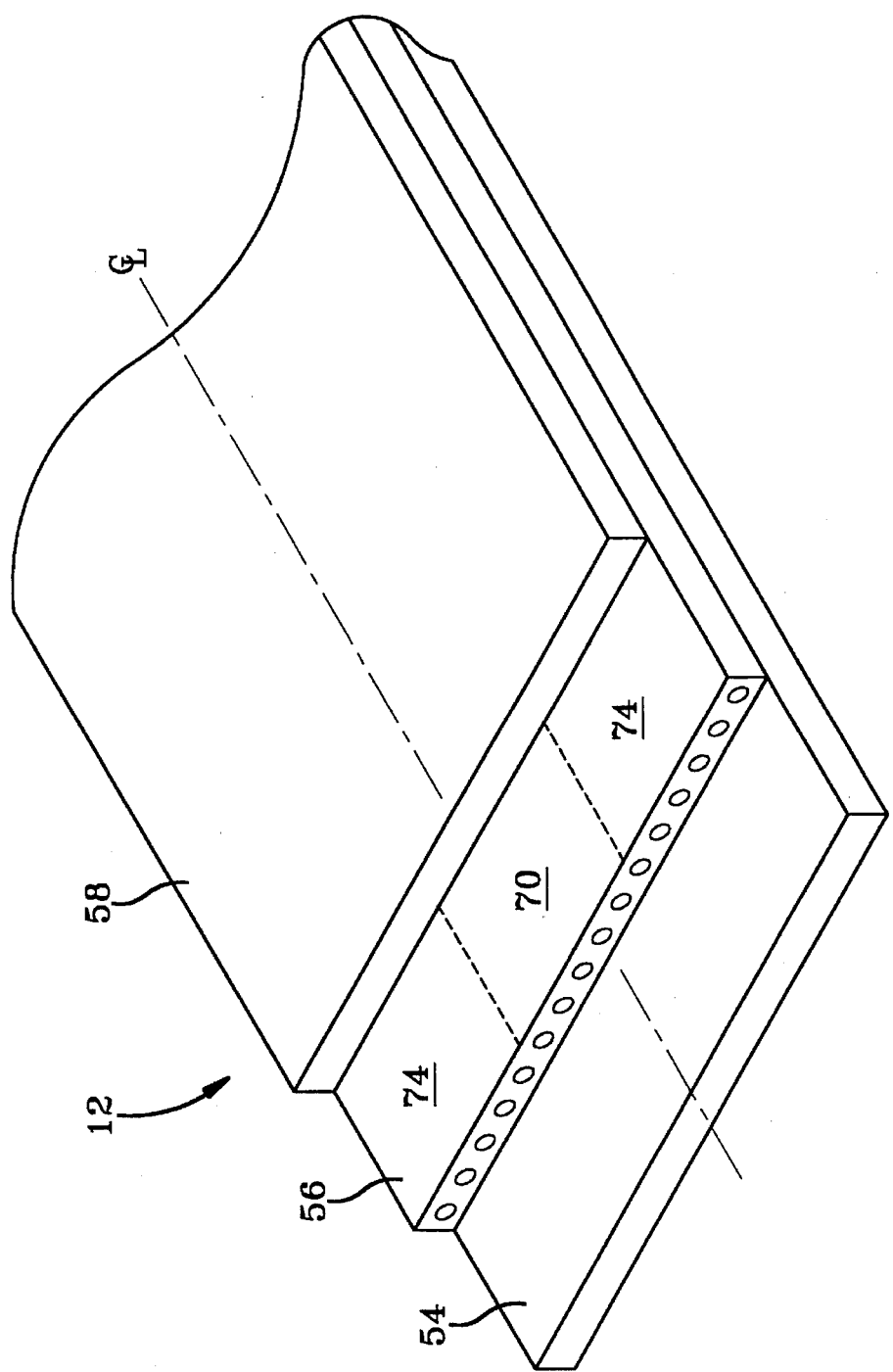
FIG. 8 is a perspective view of one embodiment of the invention.
Figure 9:
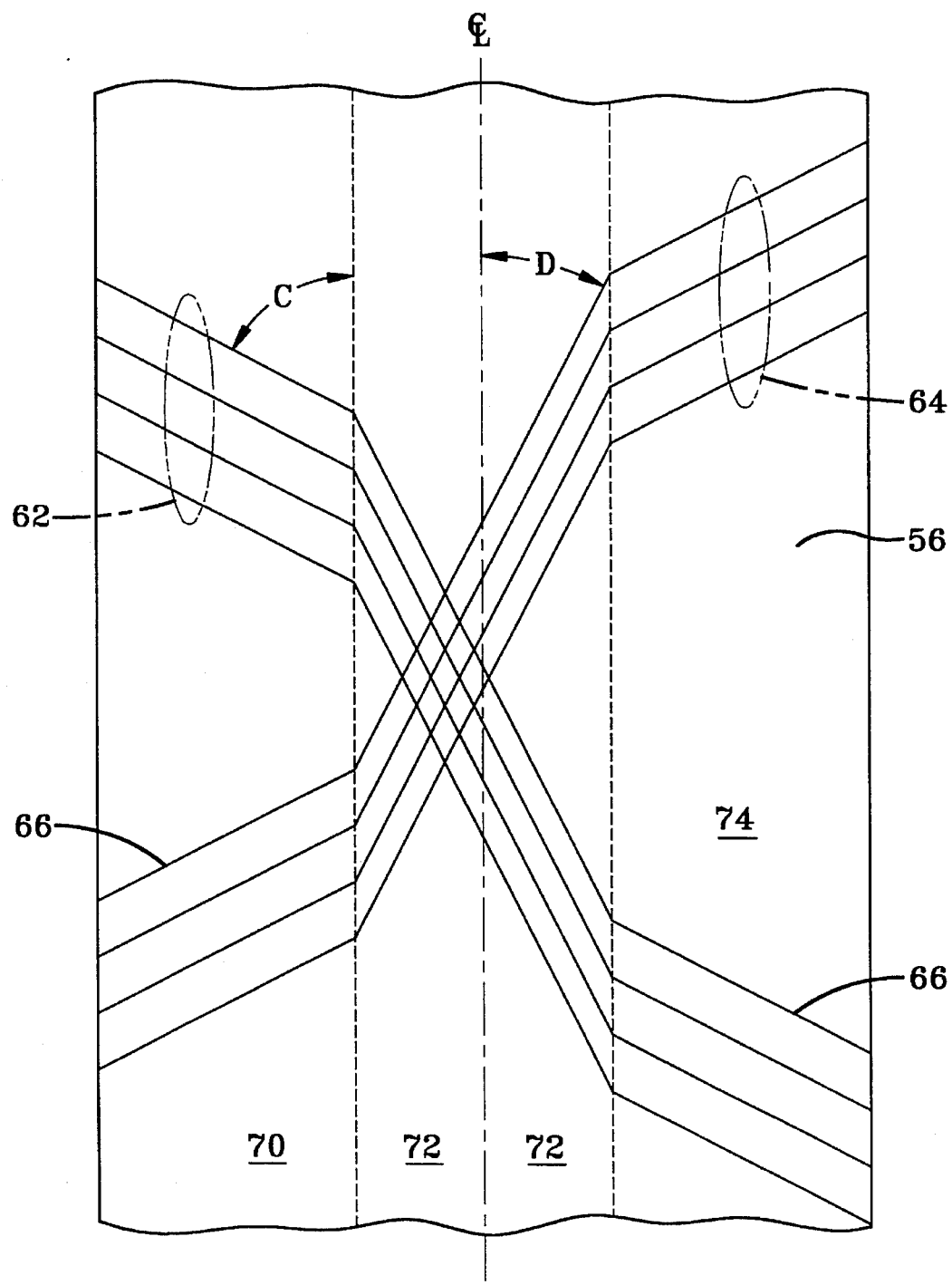
FIG. 9 is a top view of the embodiment of the invention shown in FIG. 8.

With reference to FIGS. 8 and 9, another embodiment of the invention is illustrated. In this embodiment, an innovative arrangement of reinforcing cords is utilized to further reduce the number of plies in the belt. Specifically, the belt 12 includes a bottom covering or first layer 54 a reinforced or second layer 56 and a top covering or third layer 58. The first and third layers 54,58 are similar in function and construction to the first and fourth layers 18,30 of the embodiment shown in FIG. 1. The different features of this particular embodiment are most clearly seen with reference to FIG. 9.

With reference to FIG. 9, a plan view of a portion of the second layer 56 is illustrated. The second layer 56 is reinforced with cords. A first group of cords 62 extend from the upper left to the lower right while a second group of cords 64 extend from the upper right to the lower left. Only a few individual cords 66 are illustrated although the pattern shown in FIG. 9 continues throughout each portion of the second layer 56. The second layer 56 comprises three regions 70,72,74, respectively. In the first and third regions 70,74, the cords 66 make an angle C with a plane parallel to the centerline CL. In a preferred embodiment, the angle C is between 30° and 40° with the preferred angle being 35°.

In the second region 72, the cords 66 make an angle D with a plane parallel to the centerline CL. The angle D is preferably between 10° and 30° with the preferred embodiment being D=20°. The important function of this design is that the cords 66 in the second region 72 will stretch a shorter distance than the cords 66 in the first and third regions 70,74. As the tensile force aligned with the centerline CL increases, the cords 66 in the second region 72 will deform until they are generally aligned with the centerline CL. At this point, the cords 66 will not stretch appreciably. Due to their lower angle, cords 66 in the first and third regions 70,74 will continue to stretch.

It is important to understand that individual cord 66 takes on angle C, then angle D, the angle C and moves from one side of then belt to the other. It is also important to understand that the reinforcing cords such as in the first group of cords 62 may be in the same ply as the second group of cords 64 or may be in alternate plies which laid adjacent to one another.

The present invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. A stretchable conveyor belt having lateral edges separated by a width and a centerline, said conveyor belt comprising:

a first reinforced layer comprising reinforcing cords, said cords being placed in a crisscross pattern, wherein said cords form an angle $\alpha$ with said centerline;

a second reinforced layer comprising reinforcing cords, said cords being placed in a crisscross pattern, wherein said cords form an angle B with said centerline, said angle B being less than said angle $\alpha$;

a bottom covering layer;

a top covering layer;

a strip layer of elastomeric material mounted on said top covering layer, said trip layer having a width less than said width of said conveyor belts; and, locking plates attached to said strip layer, said locking plates having a length equal to said width of said strip layer.

2. The conveyor belt of claim 1 wherein said lateral edges bend upwardly and inwardly upon application of longitudinally-directed tension.

3. The conveyor belt of claim 2 wherein, upon said application of said longitudinally-directed tension said lateral edges overlap each other, whereby said locking plates support said overlapping lateral edges and said overlapping edges and said locking plates form enclosed volumes.

* * * * *